Patented Oct. 30, 1934

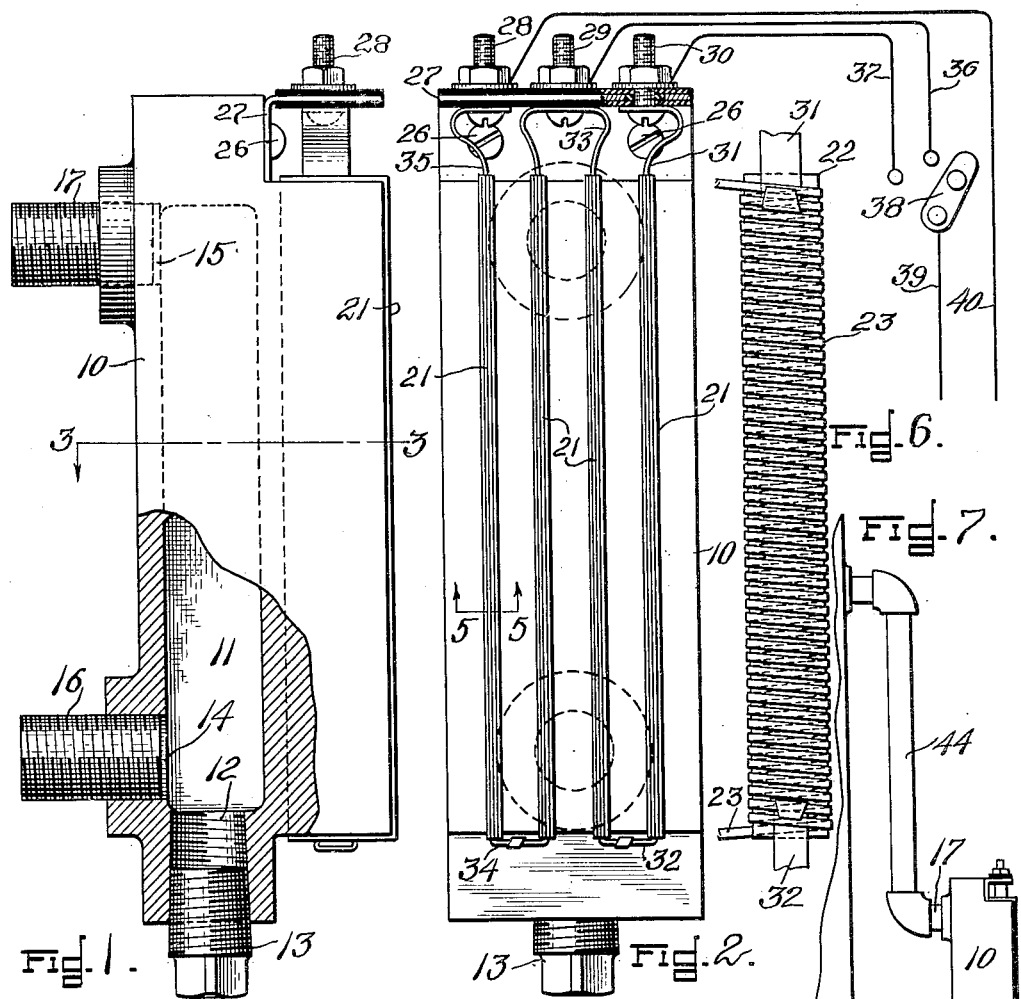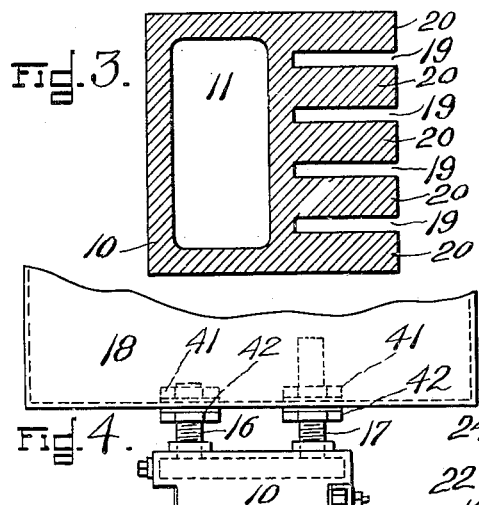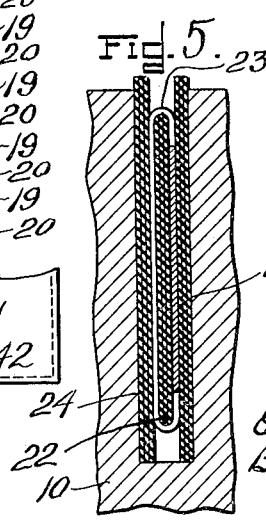

1,978,690

UNITED STATES PATENT OFFICE 1,978,690

ELECTRIC WATER HEATING APPARATUS

Eric S. Peterson, Lexington, Mass.

Application September 9, 1933, Serial No. 688,785

3 Claims. (Cl. 219—39)

My invention relates to electric water heating apparatus and especially to an improved electric water heating unit.

The object of my invention is to improve the construction and operation of electric water heating apparatus and it is also an object of this invention to provide an inexpensive and efficient water heating unit of improved construction which can be quickly and conveniently connected with an existing vessel or container to heat the contents thereof.

To these ends I have provided an electric water heating apparatus having the peculiar features of construction and mode of operation set forth in the following description, the several novel features of the invention being particularly pointed out and defined in the claims at the close thereof.

In the accompanying drawing:

Figure 1 is a side elevation, partly in section, of a water heating unit constructed in accordance with my invention.

Figure 2 is a front view of the unit shown in Fig. 1.

Figure 3 is a section on line 3—3 of Fig. 1 with the heating elements omitted.

Figure 4 is an elevation of the lower part of a water heating apparatus including the unit shown in Figs. 1 and 2.

Figure 5 is an enlarged sectional view on line 5—5 of Fig. 2.

Figure 6 is an elevation of one of the heating elements hereinafter referred to.

Figure 7 is a side elevation of a portion of another type of water heating apparatus provided with a heating unit like that illustrated in Figs. 1 and 2.

My improved heating unit comprises a body 10 which, in the best form of my invention, consists of a one-piece cast block of aluminum which material is an excellent conductor of heat. This body block 10 is of oblong or elongate form and cast with a longitudinal cored water chamber 11 provided at one end with a clean-out port 12 that is threaded to receive a threaded removable closure plug 13. The body block 10 is also formed with two other ports 14 and 15, one of which is adjacent to and communicates with one end of chamber 11 and the other of which is adjacent to and communicates with the opposite end of said chamber. These two ports are threaded to receive nipples 16 and 17, respectively, by means of which the unit is connected with the bottom of an urn, or other vessel 18 holding water or other liquid that is to be heated.

Three of the longitudinal side walls of chamber 11 are made relatively thin while the fourth longitudinal side wall is first cast solid and much thicker than the other three longitudinal side walls after which several parallel longitudinal grooves 19 are cut into the outer side thereof perpendicularly by means of a milling machine so that the opposite side walls of each are smoothly finished and truly parallel. As shown in Fig. 3 the grooves 19 alternate with fins 20 and the grooves and fins are in close proximity to the water chamber 11.

Into each groove 19 is forced a heating element 21 comprising a sheet mica core 22 on to which is wound a flat metal resistance wire or filament 23, said core and wire being disposed between two layers 24 and 25 of sheet mica which fit tightly and flatwise against the side walls of the groove so that there are no air pockets between said layers and said walls, or between said layers and said wire or filament other than the spaces between the convolutions of the latter.

This absence of air pockets between the layers 24 and 25 and the walls of the groove ensures quick transmission of heat from the resistance wire or filament to the fins 20 and from the fins 20 to the water within chamber 11. As a result the life of the filament is longer and the device is more efficient than would be the case if such air pockets existed.

Each heating element 21 is a snug fit for its groove so that it is necessary to force the element into said groove when assembling the parts. Consequently, the heating element is frictionally held within its groove and its parts are clamped together and therefore held against relative displacement while the heater is in use.

Fastened to one end of the body block 10 by means of screws 26 is an angle-iron shelf 27 supporting three binding posts 28, 29 and 30, said posts being insulated from each other and from said shelf as shown in Figs. 1 and 2.

The resistance wires or filaments of the heating elements 21 are connected in series between the two binding posts 28 and 30 by conductors 31, 32, 33, 34 and 35, while the conductor 33 which connects the resistance wires or filaments of the two intermediate heating elements 21 is connected with the intermediate binding post 29. This construction permits of connecting the device with one or more current supplying circuits so that the action of the heater can be regulated and controlled. As herein shown the posts 29 and 30 are connected by conductors 36 and 37, respectively, with the fixed contacts of a switch having a movable contact 38 to which one line wire 39 is connected, the other line wire 40 being connected with the binding post 28. When the movable contact 38 is on the fixed contact of conductor 36 only the two heating elements between binding posts 28 and 29 are in action but when contact 38 is shifted on to the fixed contact of conductor 37 all of the heating elements are in use.

When only two heating elements are in use the resistance is correspondingly small but since the current flow varies inversely with the resistance the intensity of the heat will be greater when only two elements are in use than when all four elements are in use.

Each conductor 31, 32, 33, 34 and 35 is a short strip of sheet metal and each end thereof that is connected with a filament 23 is, as shown in Fig. 6, slid into position beneath one or two of the endmost convolutions of the filament and then bent back upon itself to form a hook.

In Figure 4 I have shown my new heating unit applied, as an attachment, to the bottom of a vessel such as a coffee urn, in which case it is only necessary to form two holes in the bottom wall of the urn for the reception of the ends of the nipples 16 and 17 and to employ nuts 41 and 42 to fasten said nipples in place.

In Fig. 7 the unit is shown as applied as an attachment to a boiler 43 in which case the nipple 17 is connected by piping 44 with the upper portion of the interior of the boiler and the nipple 16 by piping 45 with the lower portion of the interior thereof.

What I claim is:

1. In a liquid heating apparatus, the combination with the wall of a container for liquids, said wall being formed with two apertures, of an electric heating unit comprising a one-piece elongate cast metal body interiorly provided with a longitudinally disposed elongate cored water chamber having a threaded water inlet port adjacent to one end thereof and a threaded water outlet port adjacent to the opposite end thereof; a pipe conduit having one end thereof screwed into said threaded inlet port, said pipe conduit extending outwardly from said port through one of said apertures and being fastened to said container wall so as to provide a leak-proof joint; a pipe conduit having one end thereof screwed into said threaded outlet port, said pipe conduit extending outwardly from said outlet port through the other of said apertures and being fastened to said container wall so as to provide a leak-proof joint; electric heating elements mounted within relatively parallel grooves formed in said body; binding posts mounted upon and insulated from said body; and conductors connecting said elements in series and also to said binding posts, said grooves being disposed parallel to said cored water chamber with their bottom walls in proximity thereto.

2. In a liquid heating apparatus, the combination with the bottom horizontal wall of a container for liquids, said bottom wall being formed with two apertures, of an electric liquid heating unit comprising a one-piece elongate cast aluminum body interiorly provided with a longitudinally and horizontally disposed elongate cored water chamber having a threaded water inlet port at its top adjacent to one end thereof and a threaded water outlet port at its top adjacent to the opposite end thereof; a pipe nipple having one end thereof screwed into said threaded inlet port, said nipple extending upwardly from said port through one of said apertures and being fastened to said bottom wall so as to provide a leak-proof joint; a pipe nipple having one end thereof screwed into said threaded outlet port, said nipple extending upwardly from said outlet port through the other of said apertures and being fastened to said bottom wall so as to provide a leak-proof joint; electric heating elements mounted within grooves formed in said body; binding posts mounted upon and insulated from said body; and conductors connecting said elements in series and also to said binding posts.

3. A liquid heating apparatus constructed in accordance with claim 2 wherein the outlet nipple is longer than the inlet nipple so that its upper end is above the level of the upper end of the inlet nipple.

ERIC S. PETERSON.